(12) United States Patent
Sitarski et al.

(10) Patent No.: US 8,272,920 B2
(45) Date of Patent: *Sep. 25, 2012

(54) CHILDREN'S RIDE-ON VEHICLES HAVING MECHANICAL ASSEMBLIES

(75) Inventors: Gerald P. Sitarski, Grand Island, NY (US); David Grober, East Aurora, NY (US); Ronald M. Asbach, Grand Island, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/192,874

(22) Filed: Jul. 28, 2011

(65) Prior Publication Data
US 2011/0284297 A1 Nov. 24, 2011

Related U.S. Application Data

(63) Continuation of application No. 12/389,775, filed on Feb. 20, 2009, now Pat. No. 7,988,524.

(60) Provisional application No. 61/058,164, filed on Jun. 2, 2008.

(51) Int. Cl.
*A63H 17/00* (2006.01)

(52) U.S. Cl. ........................................................ 446/470

(58) Field of Classification Search ........................ None
See application file for complete search history.

(56) References Cited

U.S. PATENT DOCUMENTS

| | | |
|---|---|---|
| 1,483,033 A | 2/1924 | Wisman |
| 2,735,221 A | 2/1956 | Fields |
| 4,098,517 A | 7/1978 | Sortini |
| 4,244,592 A | 1/1981 | Lohr |
| 4,264,080 A | 4/1981 | Kassai |
| 4,424,978 A | 1/1984 | Kassai |
| 4,568,307 A | 2/1986 | Gabler et al. |
| 4,572,530 A | 2/1986 | Marino |
| 4,668,205 A | 5/1987 | Choy et al. |
| 4,682,969 A | 7/1987 | Choy et al. |
| 4,741,544 A | 5/1988 | Kassai |
| 5,112,267 A | 5/1992 | Liu et al. |
| 5,292,275 A | 3/1994 | Swisher et al. |
| 5,310,379 A | 5/1994 | Hippely et al. |

(Continued)

FOREIGN PATENT DOCUMENTS

JP 57-128580 8/1983

OTHER PUBLICATIONS

Mattel Catalog, 1994, cover page and pp. 24-37.

(Continued)

*Primary Examiner* — Gene Kim
*Assistant Examiner* — Amir Klayman
(74) *Attorney, Agent, or Firm* — DASCENZO Intellectual Property Law, P.C.

(57) ABSTRACT

Children's ride-on vehicles are disclosed. In some embodiments, the vehicle may include first and second mechanical members, with the second mechanical member configured to move between a concealing position, in which the second mechanical member conceals a portion of the first mechanical member, and a revealing position, in which the second mechanical member does not conceal the portion of the first mechanical member. In some embodiments, a biasing member urges the second mechanical member toward the concealing position. In some embodiments, a user input device permits a child to lock the first mechanical member in one of a retracted position and an extended position.

20 Claims, 8 Drawing Sheets

U.S. PATENT DOCUMENTS

| | | |
|---|---|---|
| 5,316,515 A | 5/1994 | Hyman et al. |
| 5,334,078 A | 8/1994 | Hippely et al. |
| D354,723 S | 1/1995 | Nelson |
| 5,474,486 A | 12/1995 | Chilton et al. |
| 5,525,090 A | 6/1996 | Halford et al. |
| 5,580,296 A | 12/1996 | Chow |
| 5,626,506 A | 5/1997 | Halford et al. |
| 5,924,910 A | 7/1999 | Liu |
| 6,139,061 A | 10/2000 | Lewis |
| 6,405,817 B1 | 6/2002 | Huntsberger et al. |
| 6,412,787 B1 | 7/2002 | Pardi et al. |
| 6,524,156 B1 | 2/2003 | Horchler et al. |
| 6,656,010 B1 | 12/2003 | Bienz et al. |
| 6,780,076 B2 | 8/2004 | Horchler et al. |
| 7,306,504 B2 | 12/2007 | Saucier |
| 2002/0094744 A1 | 7/2002 | Cheng |
| 2005/0217912 A1 | 10/2005 | Kudo et al. |
| 2005/0252702 A1 | 11/2005 | Haney |
| 2005/0287923 A1 | 12/2005 | Haney |
| 2005/0287924 A1 | 12/2005 | Haney |
| 2006/0001227 A1 | 1/2006 | Hong |
| 2006/0270317 A1 | 11/2006 | Campbell |
| 2006/0278455 A1 | 12/2006 | Padginton et al. |

OTHER PUBLICATIONS

Pictures of BigFoot Battle Beasts Big Brute and associated packaging, 2004-2005, 10 pages.
Fisher-Price Catalog, Jan. 11, 2006, pp. 90 and 92.
Mattel Catalog, Feb. 2007, 3 pages.
International Search Report and Written Opinion, PCT/US2009/045787, 9 pages, United States Patent and Trademark Office, Jul. 21, 2009.

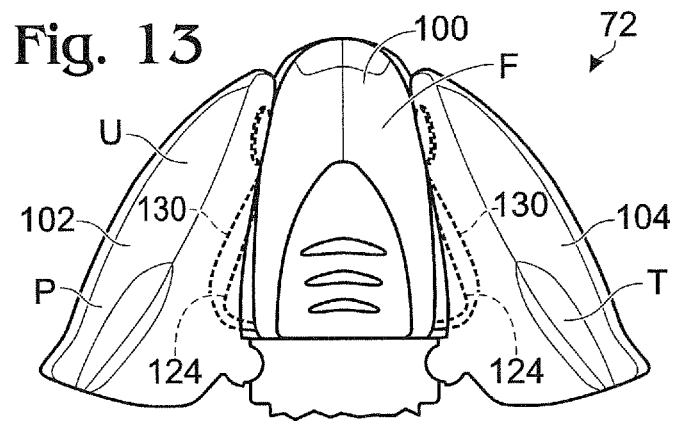
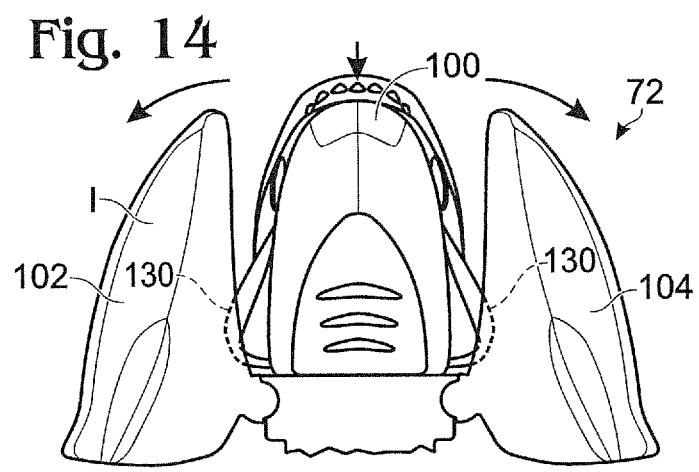
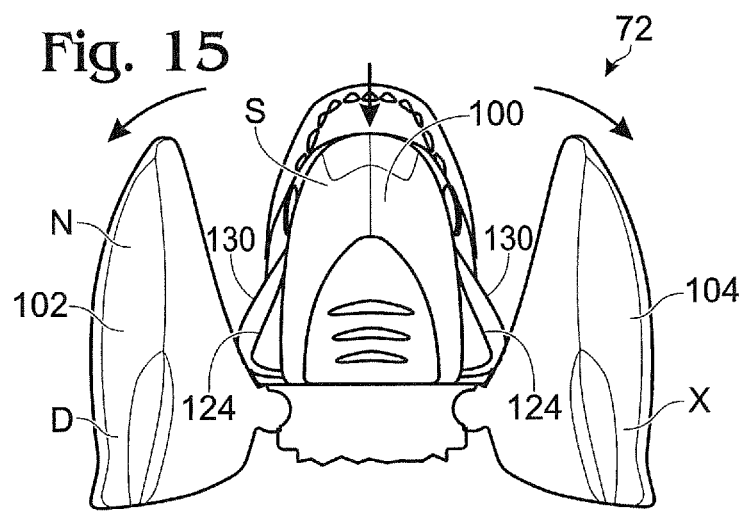

CHILDREN'S RIDE-ON VEHICLES HAVING MECHANICAL ASSEMBLIES

RELATED APPLICATIONS

The present application is a continuation patent application that claims priority under 35 U.S.C. §120 to U.S. patent application Ser. No. 12/389,775, entitled "Children's Ride-On Vehicles Having Mechanical Assemblies," which was filed on Feb. 20, 2009, and which claims priority to U.S. Provisional Patent Application Ser. No. 61/058,164, entitled "Children's Ride-On Vehicles Having Mechanical Assemblies," which was filed on Jun. 2, 2008. The complete disclosures of the above-identified patent applications are hereby incorporated by reference herein.

BACKGROUND OF THE DISCLOSURE

The present disclosure is directed to children's ride-on vehicles, particularly children's ride-on vehicles having mechanical assemblies that are adapted to move among a plurality of configurations. Examples of children's ride-on vehicles and other toy vehicles, including children's ride-on vehicles and/or other toy vehicles with one or more mechanical assemblies, include U.S. Pat. Nos. 7,306,504; 6,780,076; 6,524,156; 6,412,787; 6,405,817; 6,139,061; 5,924,910; 5,626,506; 5,580,296; 5,525,090; 5,474,486; 5,334,078; 5,316,515; 5,310,379; 4,741,544; 4,682,969; 4,668,205; 4,572,530; 4,568,307; 4,424,978; 4,264,080; 4,244,592; 4,098,517; 2,735,221; and 1,483,033; and U.S. Patent Application Publication Nos. 2006/0278455; 2006/0001227; 2005/0287924; 2005/0287923; 2005/0252702; 2005/0217912; and 2002/0094744. The complete disclosures of the above patents and patent applications are herein incorporated by reference for all purposes.

SUMMARY OF THE DISCLOSURE

The present disclosure is directed to children's ride-on vehicles. Some embodiments of children's ride-on vehicles according to the present disclosure include first and second mechanical members, with the second mechanical member configured to move between a concealing position, in which the second mechanical member conceals a portion of the first mechanical member, and a revealing position, in which the second mechanical member does not conceal the portion of the first mechanical member. In some embodiments, a user input device is configured to selectively move the first mechanical member between a retracted position and an extended position. In some embodiments, the user input device is configured to be selectively and at least temporarily locked by a child sitting on the seat of the children's ride-on vehicle so that the first mechanical member is retained in one of the retracted position and the extended position. In some embodiments, the first mechanical member is configured to move the second mechanical member from the concealing position to the revealing position in response to user manipulation of the user input device. In some embodiments, a biasing member is configured to urge the second mechanical member toward the concealing position. Other illustrative, non-exclusive examples of children's ride-on vehicles also are within the scope of the present disclosure.

BRIEF DESCRIPTION OF THE DRAWINGS

FIG. 13 is a partial top view of the children's ride-on vehicle of FIG. 2, showing a mechanical assembly in an untransformed configuration.

FIG. 14 is a partial top view of the children's ride-on vehicle of FIG. 2, showing the mechanical assembly of FIG. 13 in an intermediate configuration.

FIG. 15 is a partial top view of the children's ride-on vehicle of FIG. 2, showing the mechanical assembly of FIG. 13 in a transformed configuration.

DETAILED DESCRIPTION OF THE DISCLOSURE

Figure 1:
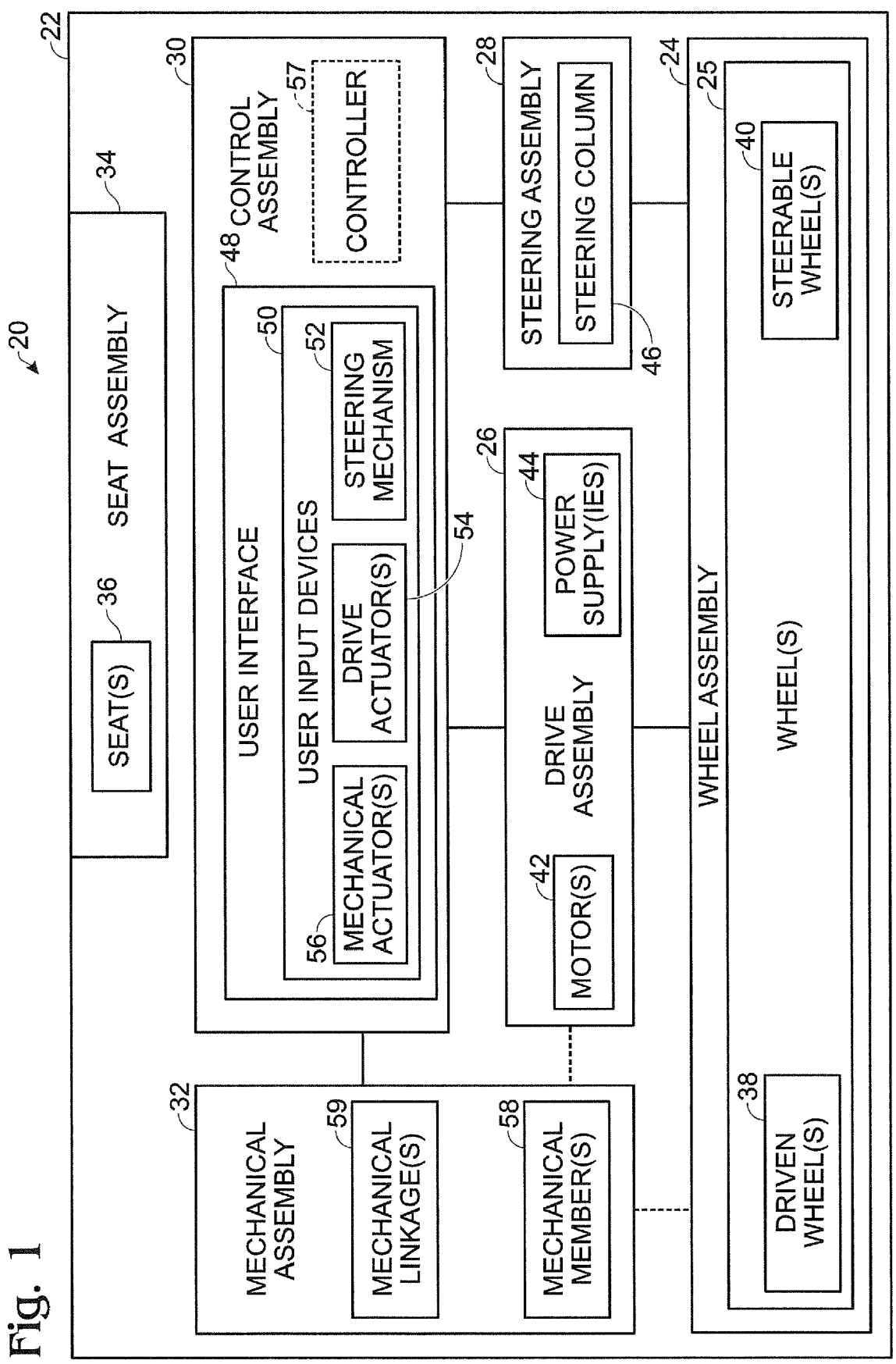
FIG. 1 is a schematic view of some embodiments of a children's ride-on vehicle.

FIG. 1 shows schematically a children's ride-on vehicle 20. The children's ride-on vehicle may include any suitable structure configured to allow a child riding on the vehicle to move across any suitable support surface and/or to increase play value of the vehicle. For example, the children's ride-on vehicle may include a body 22, a wheel assembly 24, a drive assembly 26, a steering assembly 28, a control assembly 30, and a mechanical assembly 32.

The body may include any suitable structure configured to support one or more other components of the children's ride-on vehicle. For example, the body may include at least one seat assembly 34 that is sized and configured to accommodate at least one child. Seat assembly 34 may have any suitable configuration, including configurations in which the position of the seat assembly is adjustable within the passenger compartment, and configurations in which the seat assembly includes one or more seats or one or more seating regions.

Vehicle 20 may be sized for use by a child driver. Alternatively, the vehicle may be sized for use by a child driver and a child passenger. For example, seat assembly 34 may include one or more seats or seating regions 36 that are sized and positioned to receive a child driver and/or one or more child passengers. Alternatively, the seat assembly may include only a single seat or seating region.

Additionally, body 22 may be formed from any suitable materials. For example, the body may be formed from molded plastic and/or may be integrally formed or formed from a plurality of parts that may be secured together by screws, bolts, clips, and/or other suitable fasteners. Body 22 may additionally, or alternatively, be at least partially formed from other suitable material(s), such as metal, wood, and/or composite materials.

Moreover, the body may be shaped to generally resemble any suitable vehicle. For example, body 22 may be shaped to generally resemble an all-terrain vehicle. Alternatively, the body may be shaped to resemble corresponding full-sized, or adult-sized, vehicles, such as cars, trucks, construction vehicles, emergency vehicles, off-road vehicles, motorcycles, space vehicles, aircrafts, watercrafts, etc. Additionally, or alternatively, body 22 may be shaped to resemble fantasy vehicles that do not have a corresponding adult-sized counterpart.

Wheel assembly 24 may include a plurality of wheels 25 rotatably coupled to the body and/or configured to rotatably support the body on a support surface. For example, the plurality of wheels may include at least one driven wheel 38 and/or at least one steerable wheel 40. "Driven wheel," as used herein, refers to a wheel that is rotated directly in response to a rotational input from the vehicle's drive assembly, which is either directly conveyed to the wheel by the output of the motor(s) or conveyed through linkage, such as a gearbox, belt, chain, gear assembly, axle, etc.

The driven wheel may be configured to be driven by drive assembly 26 at any suitable speed(s) and/or direction(s). Steerable wheel 40 may be configured to be steered by steering assembly 28 toward any suitable direction(s).

The wheel assembly may include any suitable number of wheels, such as two wheels, three wheels, four or more wheels. Any combination of those wheels may be driven and/or steerable. For example, when the plurality of wheels includes two front wheels and two rear wheels, all wheels may be driven (all-wheel drive configuration) with one or more of those wheels being steerable. Alternatively, the two front wheels may be steerable and the two rear wheels may be driven (rear-wheel drive configuration), or vice-versa (front-wheel drive configuration).

Drive assembly 26 may include any suitable structure configured to selectively drive the rotation of the at least one driven wheel. For example, the drive assembly may include at least one motor 42 and at least one power supply 44. The motor may be configured to drive the rotation of at least one of the driven wheels of the plurality of wheels. The motor may be described as providing an output that provides a rotational input to the driven wheel(s). The output may include one or more of a rotating shaft and/or a rotation pinion or output gear.

The drive assembly may include any suitable number of motors 42. For example, the drive assembly may include a single motor to drive the driven wheels. Alternatively, the drive assembly may include two motors where a first motor may drive a subset of the plurality of wheels, such as a first pair of a front wheel and a rear wheel, while a second motor may drive another subset of the plurality of wheels, such as a second pair of a front wheel and a rear wheel. Alternatively, drive assembly 26 may include more than two motors.

Motor 42 may additionally power other moveable components of vehicle 20. For example, the motor may power one or more components of mechanical assembly 32. In some embodiments, the motor may move one or more mechanical members of the mechanical assembly. For example, the motor may move one or more of the mechanical members toward extended positions and/or retracted positions.

Power supply 44 may include any suitable structure configured to provide power to the drive assembly. For example, the power supply may include one or more rechargeable batteries, capacitors, etc. Power supply 44 may be operably connected to the motor by any suitable electrical connectors, such as cables, wires, positive and negative terminals or leads, etc.

The drive assembly may additionally, or alternatively, be configured to receive driving inputs from a user, such as via control assembly 30, and to convey those driving inputs to the plurality of wheels. When the power supply includes one or more batteries, the drive assembly may be referred to as a "battery-powered drive assembly."

Although drive assembly 26 is shown to include motor 42 and power supply 44, the drive assembly may additionally, or alternatively, include any suitable components and/or assemblies configured to selectively drive the rotation of the at least one driven wheel. For example, drive assembly 26 may include a motor output linkage that transmits the rotational input from the motor's output(s) to the driven wheels. The linkage may include an intermediate linkage between the output and the driven wheel(s), such as a gearbox containing one or more gears, a belt or chain drive, a worm gear, one or more individual gears, etc.

Additionally, or alternatively, the motor output linkage may be configured to transmit the rotational input from the motor(s) to the driven wheel(s) at the same relative rate of rotation, or it may mechanically augment the rotational input to convey a greater or lesser rate of rotation relative to the rate of rotation of the output of the motor(s). Alternatively, the drive assembly may be formed without the motor output linkage, in which case the output(s) of the motor(s) may directly transmit the rotational input to the driven wheel(s).

Steering assembly 28 may include any suitable structure configured to selectively steer the at least one steerable wheel. For example, the steering assembly may include at least one steering column 46 and/or other mechanical linkage that receives steering inputs from control assembly 30 and steers one or more of the steerable wheels based, at least in part, on the steering inputs. The steering column may, for example, include an end portion distal the steering mechanism, with that end portion being coupled via a suitable tie rod or steering linkage, to steering collars, or steering levers, associated with one or more steerable wheels.

Control assembly 30 may include any suitable structure configured to receive user inputs and/or to convey those inputs to drive assembly 26, steering assembly 28, and/or mechanical assembly 32. For example, control assembly 30 may include a user interface 50 configured to receive user inputs, such as driving, steering, and/or mechanical inputs. The user interface may include one or more user control devices or user input devices 50. For example, the user input devices may include a steering mechanism 52, which may be any suitable structure configured to steer one or more of the steerable wheels via user-applied steering inputs to the steering mechanism. The steering mechanism may, for example, be in the form of steering wheel(s), handlebar(s), and/or steering lever(s).

Additionally, user input devices 50 may include one or more drive actuators 54, which may include any suitable structure configured to selectively energize the motor(s) responsive to a user input directing the power supply(ies) to actuate or otherwise energize the motor(s). For example, the drive actuators may include an on/off switch, a foot pedal, a throttle lever, and a rotational handgrip on a steering mechanism that includes a handlebar.

The user inputs, such as those conveyed via one or more of the drive actuators, may be adapted to select, or configure, the drive assembly within a plurality of drive configurations. Those user inputs may be referred to as configuration inputs and may be adapted to enable, or select, one or more of a plurality of drive configurations. Similarly, the drive actuator(s) utilized to receive the configuration inputs from user, such as a child sitting on the ride-on vehicle's seat, may be referred to as configuration input devices.

The plurality of drive configurations may be realized, or implemented, when the motor(s) is energized, such as responsive to actuation/energization of the motor(s) by the battery(ies). For example, the plurality of drive configurations may include one or more of the direction (forward or reverse) in which the drive assembly may propel the vehicle upon energization of the motor(s), the relative speed or range of speed which the motor(s) may be configured/energized to provide, and/or whether the drive assembly may be able to be actuated responsive to an actuation input to drive actuator 54.

For example, speed drive configurations, such as "high" and "low" speed configurations, "high," "medium," and "low" speed configurations, etc., may be selected with one or more drive actuators, such as in the form of a speed switch. Those speed drive configurations may be realized (i.e., the vehicle may be propelled according to the selected speed drive configuration) upon actuation or energization of the motor(s). The speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by drive actuator 54, such as in the form of a direction switch. The direction switch may enable a user to select the relative direction (i.e., clockwise or counterclockwise) of rotation and thereby configure the vehicle to drive in forward and reverse directions upon energization of the motor(s).

A further example of drive configurations may be referred to as power configurations and may relate to whether or not the drive assembly's motor(s) is in an energized state in which the motor assembly may be driving the rotation of the driven wheel(s), or a de-energized state in which the motor(s) may not be driving the rotation of the driven wheel(s). In other words, when in the de-energized drive configuration, the motor(s) does not drive the rotation of the ride-on vehicle's driven wheel(s).

As an example, the drive assembly may be selectively configured from a de-energized drive configuration to an energized drive configuration responsive to a user, such as a child sitting on a seat of the ride-on vehicle, actuating one or more of the drive actuators. As discussed, this may include pressing or otherwise manipulating a throttle lever or button, or depressing a foot pedal.

The drive assembly may include any suitable structure to selectively enable the plurality of drive configurations. For example, switching between forward and reverse drive configurations may be implemented by reversing the polarity of the battery(ies) relative to the motor(s). As another example, relative speed configurations may be achieved by switching two or more batteries and/or two or more motors between series and parallel configurations.

As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation, or other duty cycle ramping, of the energization of the motor assembly.

Although particular drive configurations are discussed, other suitable drive configurations are included in the present disclosure. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

The user input devices also may include one or more mechanical actuators 56, which may include any suitable structure configured to selectively move one or more mechanical members of mechanical assembly 32 via user-applied mechanical inputs to the user input device(s). For example, the mechanical actuators may include shifter(s), lever(s), pull cord(s), button(s), and/or knob(s).

User input devices 50 may be positioned in any suitable portion(s) of the body, such as positioned to receive inputs from a child sitting on the at least one seat. For example, the user input devices may be located in any suitable location within or near the seat so that a child sitting on seat 36 may reach those devices while positioned to operate the vehicle, such as while having at least one hand on the steering mechanism.

In some embodiments, control assembly 30 may include a controller 57, which may control the operation of the drive assembly responsive to at least one of received user inputs and predetermined programming. As an example, controller 57 may be adapted to control electronically the transmission of a user-selected speed to the driven wheel(s) and/or to configure the drive assembly to the user-selected drive configuration. Controller 57 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 50, predetermined programming, and/or inputs from other sensors or switches.

When controller 57 is adapted to regulate the energization of the motor assembly, it may regulate electronically the rotational input transmitted by the motor(s) to the driven wheel(s). For example, controller 57 may regulate at least one of the timing and the ramp, or rate, of application of the transmission of the rotational input after actuation of a corresponding user input device by a child sitting on seat 36. In other words, the controller may be configured to delay in at least time and/or rate of transmission the rotational input to the driven wheel assembly responsive at least in part to a user input selecting the desired, or selected, rotational input. An example of a suitable controller is disclosed in U.S. Pat. No. 6,771,034, the complete disclosure of which is herein incorporated by reference for all purposes.

In some embodiments, controller 57 may selectively control the transmission of the selected rotation input (such as determined by the selected speed configuration and/or actuation input). In other words, controller 57 may be configured to control the transmission of the selected rotational input in certain situations, such as when certain parameters or thresholds are satisfied. For example, controller 57 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), and/or when the ride-on vehicle changes direction.

The control assembly may be referred to as being configured to be in control communication with the drive, steering, and/or mechanical assemblies. "Control communication," as used herein, refers to the control assembly being physically connected, remotely connected, and/or connected in other suitable way(s) to allow the control assembly to convey user inputs to one or more other components of the children's ride-on vehicle, such as the drive, steering, and/or mechanical assemblies. Although control assembly 30 is shown to convey user inputs to drive assembly 26, steering assembly 28, and mechanical assembly 32, the control assembly may additionally, or alternatively, convey user inputs to other components of the children's ride-on vehicle.

Mechanical assembly 32 may include any suitable structure adapted to move relative to the body among a plurality of configurations. In some embodiments, the mechanical assembly may be responsive, at least in part, to user-applied mechanical inputs to one or more of the mechanical actuators. For example, the mechanical assembly may move among a first configuration, such as an untransformed configuration, a second configuration, such as an intermediate configuration, and a third configuration, such as a transformed configuration.

The configuration of the mechanical assembly may change the appearance of the vehicle. For example, the vehicle may resemble a traditional vehicle when the mechanical assembly is in the first configuration. Additionally, or alternatively, the vehicle may have one or more animal-like features when the mechanical assembly is in the third configuration. The vehicle may be referred to as a "transforming ride-on vehicle" when it includes a mechanical assembly that enables a user to change the appearance of the vehicle.

Animal-like features may include a head, claws, arms, a nose, a mouth, a tongue, teeth, a tail, etc. Those features may resemble corresponding features on a toy animal, such as a toy dinosaur, a toy alien, a toy sea creature, etc. Although the vehicle is discussed to include animal-like features, the vehicle may alternatively, or additionally, include other type(s) of features. For example, the vehicle may include features of toy robots, aircrafts, watercrafts, etc., which may allow a user to selectively transform the ride-on vehicle to a robot, an aircraft, a watercraft, a space vehicle, etc.

Mechanical assembly 32 may include one or more mechanical members 58, which may be selectively moved via user inputs to the one or more mechanical actuators. The mechanical members may be movably connected to the body (and/or one or more of the other mechanical members) and be configured to move among a plurality of positions. For example, the mechanical members may be configured to move between a first position, such as a retracted position, and a second position, such as an extended position. Additionally, mechanical assembly 32 may include at least one mechanical linkage 59 that receives mechanical inputs from control assembly 30, such as from one or more mechanical actuators 56, and moves one or more of the mechanical members based, at least in part, on the mechanical inputs.

Although mechanical actuators 56 are discussed to receive user inputs to selectively move one or more of mechanical members 58, the mechanical members may alternatively, or additionally, be operatively connected to drive assembly 26 and/or wheel assembly 24. For example, motor 42 of drive assembly 26 may move one or more of the mechanical members. Alternatively, or additionally, rotation of one or more of plurality of wheels 25 may move one or more of the mechanical members.

Additionally, although children's ride-on vehicle 20 is shown to include body 22, wheel assembly 24, drive assembly 26, steering assembly 28, control assembly 30, and mechanical assembly 32, the children's ride-on vehicle may additionally, or alternatively, include any suitable structure configured to allow the children's ride-on vehicle to move across any suitable surface and/or increase play value of the vehicle. For example, the vehicle may include an audiovisual system configured to provide audio and/or visual output responsive, at least in part, to movement of the drive actuator and/or one or more of the mechanical members of the mechanical assembly.

An example of an embodiment of a children's ride-on vehicle as described above is shown in FIG. 2 and is generally indicated at 60. Unless specifically excluded, children's ride-on vehicle 60 may include one or more components and/or one or more functions of components of children's ride-on vehicle 20, as described above. The children's ride-on vehicle may include a body 62, a wheel assembly 64, a drive assembly 66, a steering assembly 68, a control assembly 70, and a mechanical assembly 72.

Figure 3:
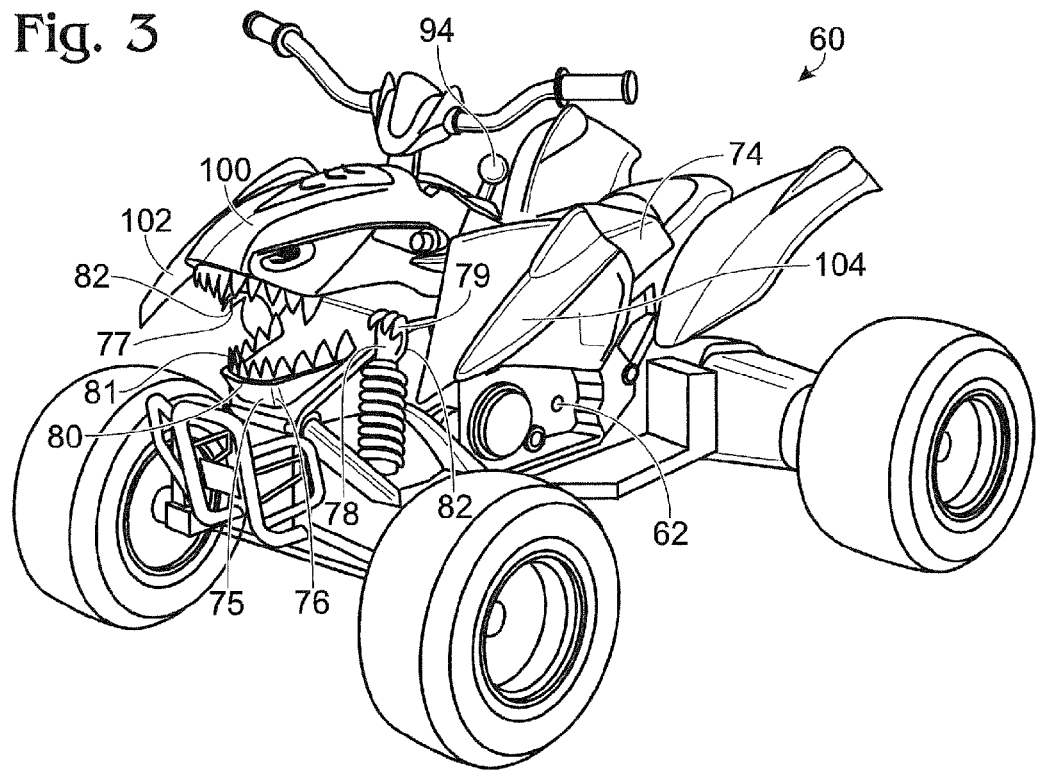
FIG. 3 is an isometric view of the children's ride-on vehicle of FIG. 2, showing a mechanical assembly in a transformed configuration.

The body may include at least one seat 74 sized for a child. Additionally, body 62 may include a plurality of portions or areas 75, such a first area 76, a second area 77, and a third area 78, as shown in FIG. 3. Moreover, body 62 may have any suitable appearance(s).

Figure 2:
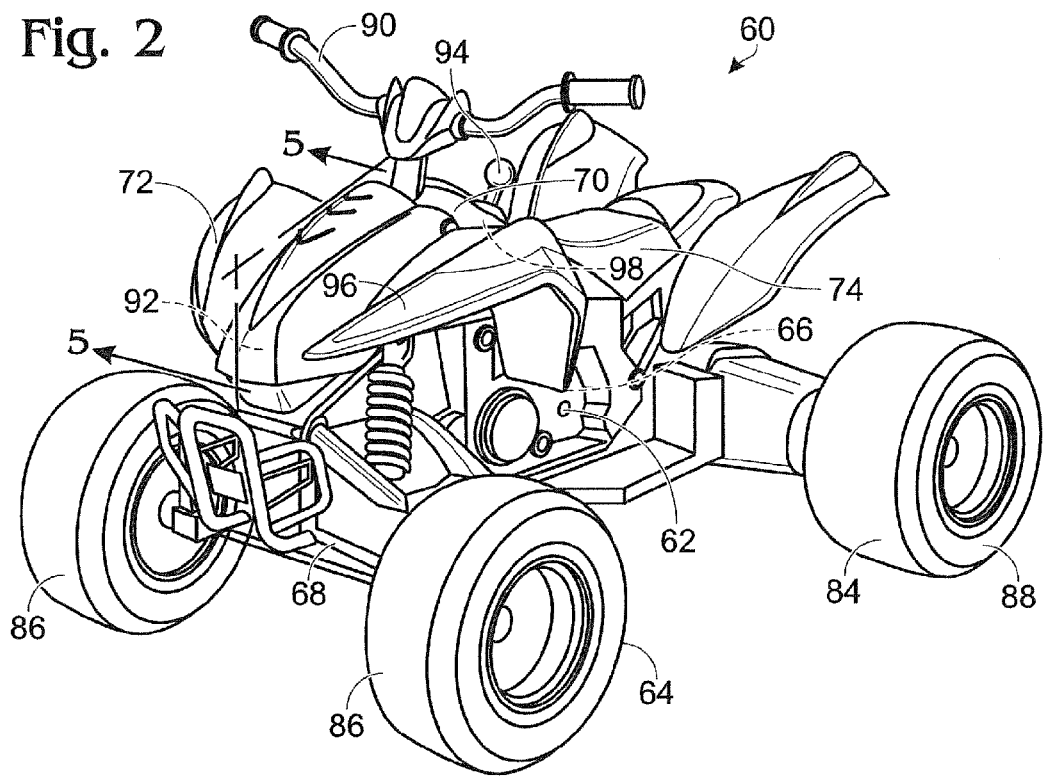
FIG. 2 is an isometric view of an example of the children's ride-on vehicle of FIG. 1, showing a mechanical assembly in an untransformed configuration.

For example, the body may have the appearance of an all-terrain vehicle, as shown in FIG. 2, with a plurality of hidden-reveal, animal-like features 79, as shown in FIG. 3. The animal-like features may include a bottom jaw 80 having teeth 81, and claws 82. Animal-like features 79 may be referred to as "features of a toy animal."

The animal-like features may be in any suitable location(s) or portion(s) of the body. For example, the bottom jaw may be in first area 76, and claws may be in second area 77 and third area 78. Although the body is shown to have the appearance of an all-terrain vehicle, the body may alternatively, or additionally, have any suitable appearance(s). For example, the body may alternatively have the appearance of a particular car, sport-utility vehicle, and/or truck. Additionally, although particular animal-like features are shown, the body may additionally, or alternatively, include other animal-like features, such as a tail, legs, scales, etc.

Wheel assembly 64 may include a plurality of wheels 84, which may be rotatably coupled to the body and may be configured to rotatably support the body on any suitable support surface. The plurality of wheels may include front wheels 86 and rear wheels 88, as shown in FIG. 2. Although plurality of wheels 84 is shown to include two front wheels 86 and two rear wheels 88, the plurality of wheels may include any suitable number of front and/or rear wheels, such as one, three, or four front wheels and/or one, three, or four rear wheels.

Drive assembly 66 and steering assembly 68 may include one or more components and/or one or more functions of components of drive assembly 26 and steering assembly 28, respectively. Control assembly 70 may include a steering handlebar 90, a foot pedal 92, and a shifter 94, as shown in FIG. 2. The steering handlebar may be configured to steer one or more of the steerable wheels via user-applied steering inputs to the steering mechanism. Foot pedal 92 may be configured to selectively energize the motor(s) responsive to a user input directing the power supply(ies) to actuate or otherwise energize the motor(s).

The shifter may be configured to selectively move one or more of the mechanical members of mechanical assembly 72 among a plurality of positions via user-applied mechanical inputs to the shifter. Shifter 94 may be positioned to be manipulated by a child sitting on the at least one seat, as shown in FIG. 2. In some embodiments, shifter 94 may be configured to be locked in one or more selected positions by the user.

Mechanical assembly 72 may include a plurality of mechanical members 96 and one or more mechanical linkages 98. The mechanical members may include any suitable number of members, such as a first mechanical member 100, a second mechanical member 102, and a third mechanical member 104, as shown in FIG. 3.

Figure 4:
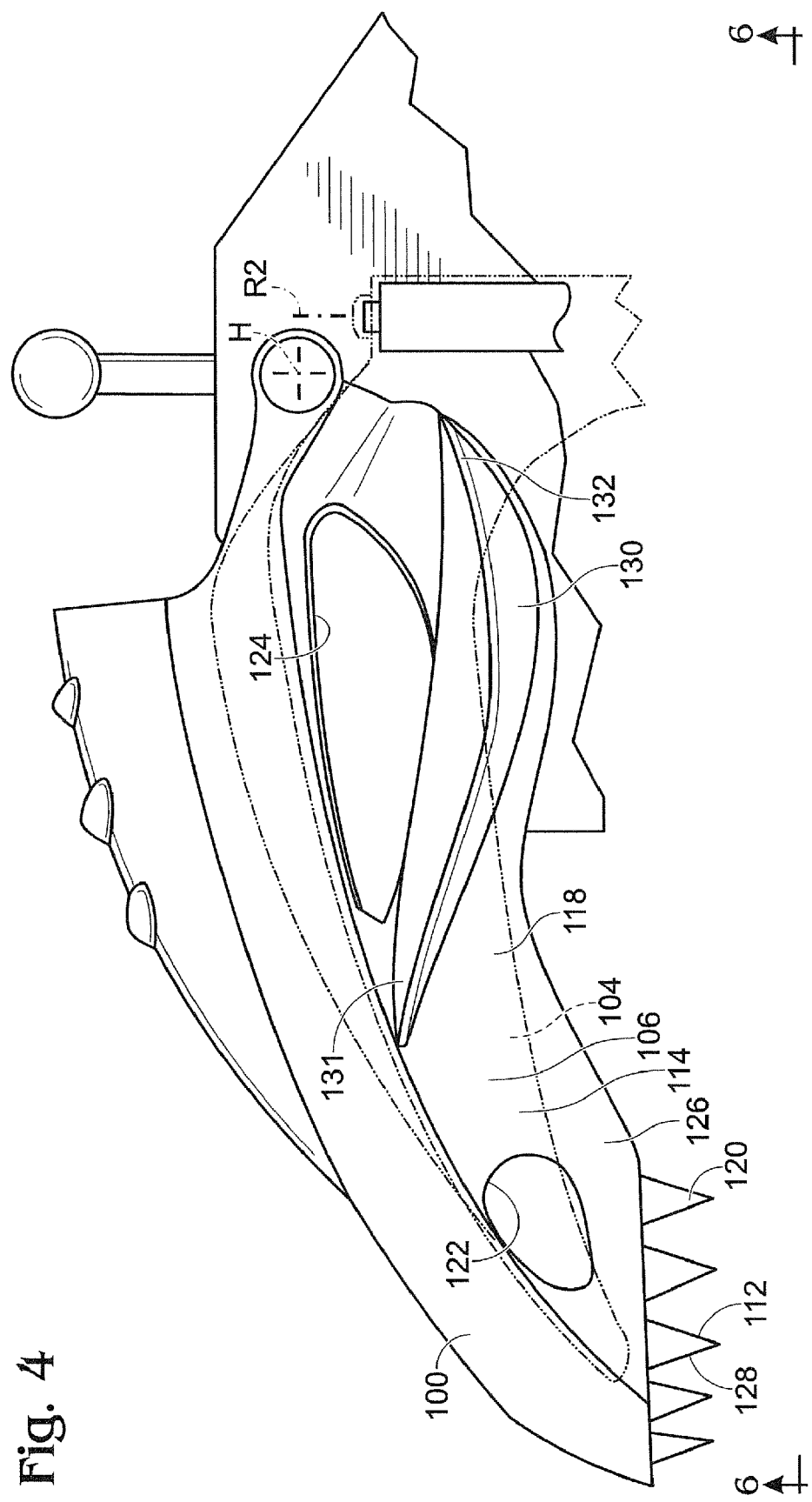
FIG. 4 is a partial side view of the children's ride-on vehicle of FIG. 2, showing a mechanical assembly with a hood and a fender in dashed lines to show animal-like features of the hood that are hidden by the fender when the hood is in a first position.
Figure 5:
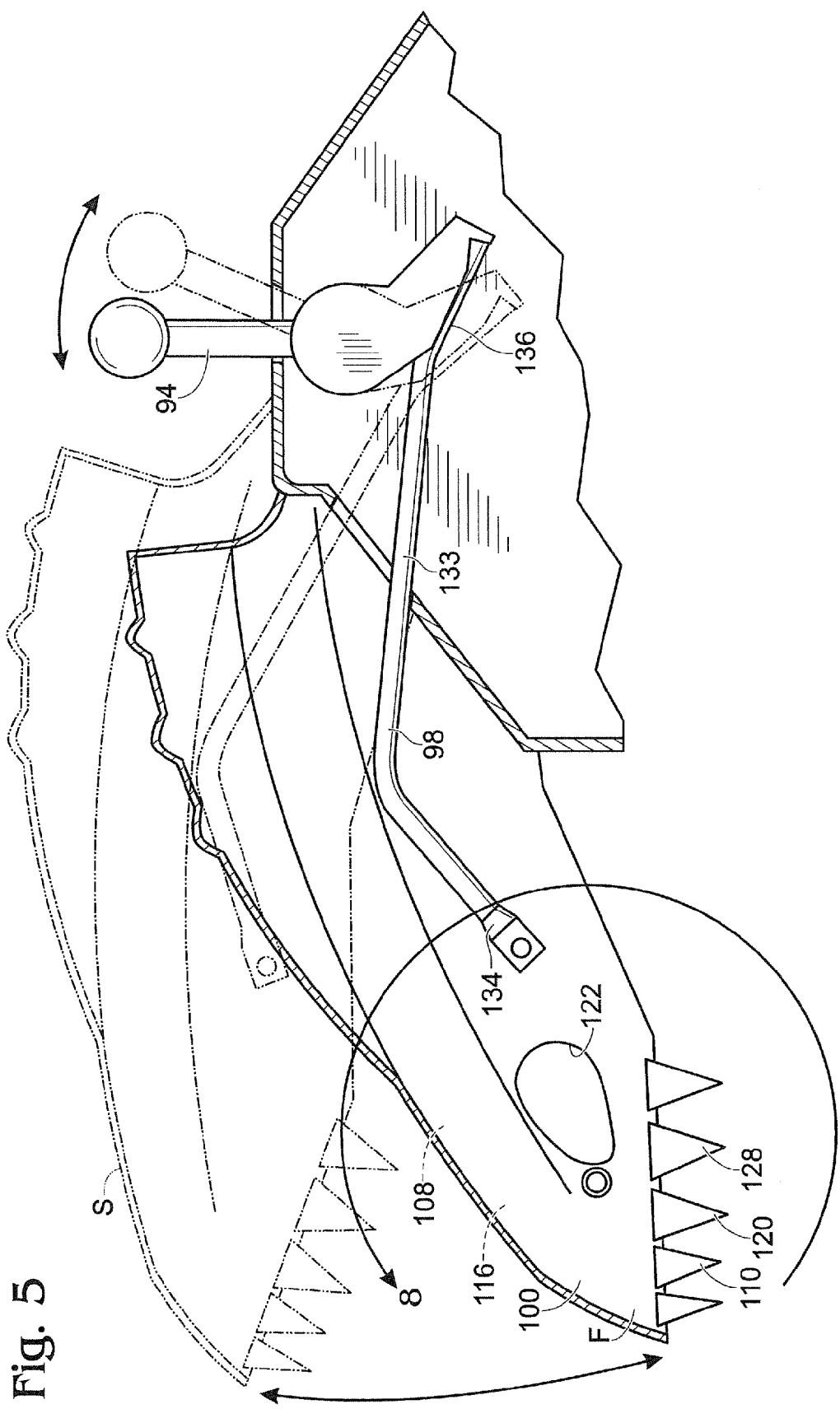
FIG. 5 is a sectional view of the hood and the actuator of FIG. 4 taken along lines 5-5 in FIG. 2, showing the hood in a first position in solid lines, and the hood in a second position in dashed lines.

The first mechanical member may include one or more portions 106, such as a first portion 108, a second portion 110, a third portion 112, and a fourth portion 114, as shown in FIGS. 4-5. Additionally, first mechanical member 100 may be movably connected to body 62 and may be configured to move among a plurality of positions. For example, first mechanical member 100 may be pivotably connected to the body to pivot about a hood axis H, as shown in FIG. 4. The first mechanical member may be configured to move between a first (or retracted) position F and a second (or extended position) S, as shown in FIG. 5.

In the first position, first mechanical member 100 may be adjacent to the body. Additionally, or alternatively, one or more portions 106 of the first mechanical member may not be visible, or may be hidden by one or more other mechanical members and/or the body when the first mechanical member is in the first position. For example, first portion 108 may be hidden by second mechanical member 102, second portion 110 and third portion 112 may be hidden by body 62, and/or fourth portion 114 may be hidden by third mechanical member 104. At least some of those portions may include animal-like features that are further discussed below.

Alternatively, or additionally, one or more areas 75 of body 62 may not be visible, or may be hidden by the first mechanical member and/or one or more other mechanical members, when the first mechanical member is in the first position. For example, first area 76 of body 62 may be hidden by first mechanical member 100 when the first mechanical member is in the first position.

In second position S, first mechanical member 100 may be spaced from the body relative to first position F. Additionally, or alternatively, one or more portions 106 of the first mechanical member may be visible, or may not be hidden, when the first mechanical member is in the second position. For example, first portion 108, second portion 110, third portion 112, and fourth portion 114 may be visible when the first mechanical member is in the second position.

Alternatively, or additionally, one or more areas 75 of body 62 may be visible, or may not be hidden, when the first mechanical member is in the second position. For example, first area 76 may be visible, or may not be hidden, when the first mechanical member is in the second position. "Visible," as used herein, means that the portion can be seen or viewed by the user on the seat of the vehicle, and/or a user and/or other persons standing adjacent to the vehicle, such as adjacent a front portion of the vehicle. "Hide" or "hidden," as used herein, means that one or more other mechanical members and/or the body prevents a user on the seat, and/or the user and/or other persons adjacent the vehicle from viewing the portion.

First mechanical member 100 may include any suitable shape(s). For example, the first mechanical member may be shaped like a hood having first and second opposed sides 116 and 118, as shown in FIGS. 4-5. Thus, first mechanical member 100 may be referred to as a "hood." The portions of the first mechanical member may be distributed in any suitable way(s) between the first and second opposed sides. For example, the first and second portions may be located on first opposed side 116, while the third and fourth portions may be located on second opposed side 118.

Additionally, the first mechanical member may include one or more animal-like features (or features of a toy animal) 120. For example, the first mechanical member may include nostrils 122, eyes 124, and an upper jaw 126 having teeth 128, as shown in FIGS. 4-5. Although first mechanical member 100 is shown to include specific animal-like features, the first mechanical member may additionally, or alternatively, include other animal-like features, such as ears and a tongue, and/or other type(s) of features.

Animal-like features 120 may be located in any suitable part(s) or portion(s) of the first mechanical member. For example, one of the nostrils and eyes may be in first portion 108, while another of the nostrils and eyes may be in fourth portion 114. Additionally, upper jaw 126 and teeth 128 may be in the second and third portions of the first mechanical member. The animal-like features may, however, be positioned in any suitable part(s) or portion(s) of the first mechanical member, including one or more portions that always are visible, or are not hidden, regardless of the position of the mechanical member(s) or the configuration of the mechanical assembly.

First mechanical member 100 also may include one or more guide ramps or ribs 130, as shown in FIG. 4. The ribs may be configured to contact and to move one or more other mechanical members. In some embodiments, the ribs may be configured to move one or more other mechanical members toward one or more positions against urging of a bias assembly.

For example, ribs 130 may be configured to contact and to move at least the second mechanical member from a third position toward a fourth position when the first mechanical member moves from the first position toward the second position. Additionally, or alternatively, ribs 130 may be configured to contact and to move the third mechanical member from a fifth position toward a sixth position when the first mechanical member moves from the first position toward the second position.

Ribs 130 may have any suitable shape(s) and/or size(s). For example, the ribs may be laterally projecting ribs that may resemble cheeks. Additionally, ribs 130 may be located in any suitable portions of the first mechanical member. For example, a rib 130 may be located in the first portion and another rib 130 may be located in the fourth portion. Ribs 130 may include a first end portion 131 and a second end portion 132. As the first mechanical member is moved from the first position toward the second position, the location where the ribs contact the other mechanical members may move from adjacent first end portion 131 to adjacent second end portion 132.

Figure 6:
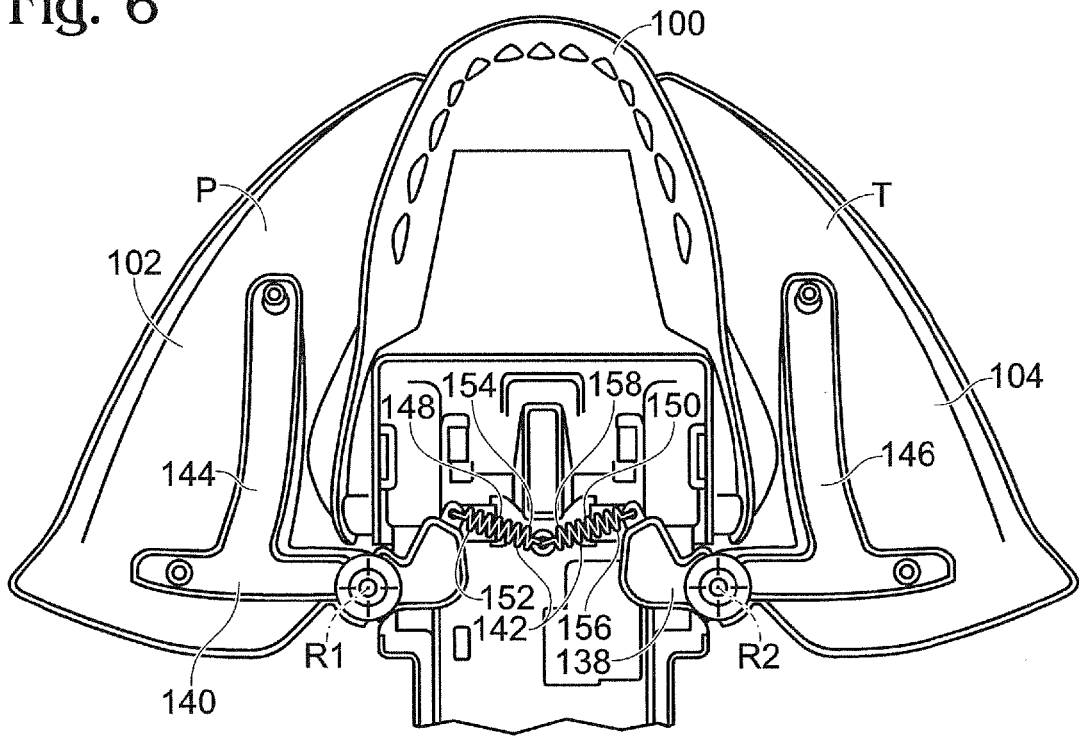
FIG. 6 is a partial bottom view of the mechanical assembly of FIG. 4, showing the mechanical assembly in an untransformed configuration.
Figure 7:
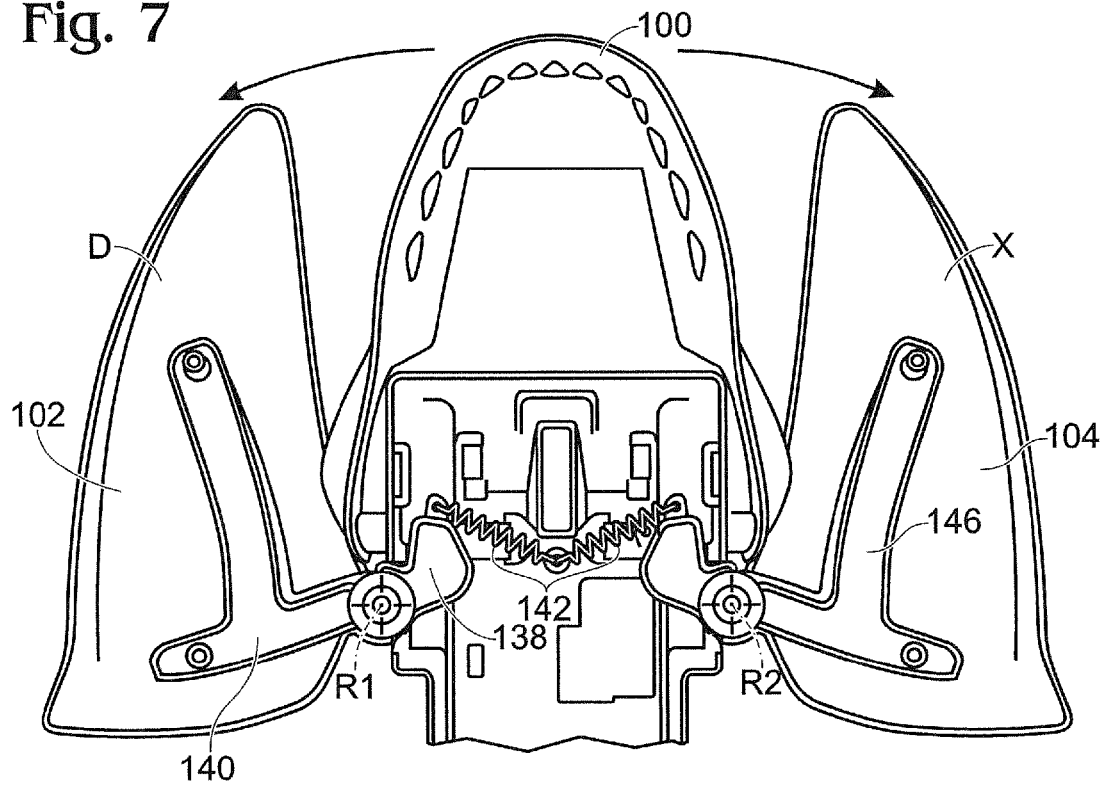
FIG. 7 is a partial bottom view of the mechanical assembly of FIG. 4, showing the mechanical assembly in a transformed configuration.

Second mechanical member 102 may be movably connected to body 62 and may be configured to move among a plurality of positions. For example, the second mechanical member may be pivotably connected to the body to pivot about a fender axis R1. Second mechanical member 102 may be configured to move between a third (or proximal) position P and a fourth (or distal position) D, as shown in FIGS. 6-7.

In the third position, second mechanical member 102 may be proximal and/or adjacent to the body and/or the first mechanical member. Additionally, or alternatively, second mechanical member 102 may hide one or more portions 106 of the first mechanical member (such as portions that include the animal-like features of the first mechanical member) when the second mechanical member is in the third position. For example, the second mechanical member may hide first portion 108 of the first mechanical member when the second mechanical member is in the third position.

Alternatively, or additionally, the second mechanical member may hide one or more areas 75 of body 62 when the second mechanical member is in the third position. For example, second mechanical member 102 may hide at least second area 77 of body 62 when the second mechanical member is in the third position.

In fourth position D, second mechanical member 102 may be distal to and/or spaced from the body and/or the first mechanical member relative to third position P. Additionally, or alternatively, second mechanical member 102 may not hide one or more portions 106 of the first mechanical member when the second mechanical member is in the fourth position. For example, the second mechanical member may not hide the first portion of the first mechanical member when the second mechanical member is in the fourth position.

Alternatively, or additionally, the second mechanical member may not hide one or more areas 75 of body 62 when the second mechanical member is in the fourth position. For example, second mechanical member 102 may not hide at least second area 77 of body 62 when the second mechanical member is in the fourth position.

Second mechanical member 102 may include any suitable shape(s). For example, the second mechanical member may be shaped like a fender that may be adjacent a wheel of the plurality of wheels, as shown in FIG. 3. Thus, second mechanical member 102 may be referred to as a "fender."

Third mechanical member 104 may be movably connected to body 62 and may be configured to move among a plurality of positions. For example, the third mechanical member may be pivotably connected to the body to pivot about a fender axis R2. Third member 104 may be configured to move between a fifth (or proximal) position T and a sixth (or distal position) X, as shown in FIGS. 6-7.

In the fifth position, third mechanical member 104 may be proximal and/or adjacent to the body and/or the first mechanical member. Additionally, or alternatively, third mechanical member 104 may hide one or more portions 106 of the first mechanical member (such as portions that include the animal-like features of the first mechanical member) when the third mechanical member is in the fifth position. For example, the third mechanical member may hide fourth portion 114 of the first mechanical member when the third mechanical member is in the fifth position.

Alternatively, or additionally, the third mechanical member may hide one or more areas 75 of body 62 when the third mechanical member is in the fifth position. For example, third mechanical member 104 may hide at least third area 78 of body 62 when the third mechanical member is in the fifth position.

In sixth position X, third mechanical member 104 may be distal to and/or spaced from the body and/or the first mechanical member relative to fifth position T. Additionally, or alternatively, third mechanical member 104 may not hide one or more portions 106 of the first mechanical member when the third mechanical member is in the sixth position. For example, the third mechanical member may not hide the fourth portion of the first mechanical member when the third mechanical member is in the fifth position.

Alternatively, or additionally, the third mechanical member may not hide one or more areas 75 of body 62 when the third mechanical member is in the sixth position. For example, third mechanical member 104 may not hide at least third area 78 of body 62 when the third mechanical member is in the sixth position.

Third mechanical member 104 may include any suitable shape(s). For example, the third mechanical member may be shaped like a fender that may be adjacent a wheel of the plurality of wheels, as shown in FIG. 3. Thus, third mechanical member 104 may be referred to as a "fender."

Although the three mechanical members are shown to include a hood and two fenders, the mechanical members may have any suitable shape(s). Additionally, although each of the mechanical members is shown to be a unitary piece, one or more of the mechanical members may include two or more components. For example, the hood may include two or more components. Moreover, although mechanical assembly 72 is shown to include three mechanical members, the mechanical assembly may include less or more mechanical members. For example, the mechanical assembly may include two mechanical members or four mechanical members.

Mechanical linkages 98 may include a hood mechanical linkage 133, as shown in FIG. 5. The hood mechanical linkage may include a first end portion 134 and a second end portion 136. The first end portion may be connected to first mechanical member 100, while the second end portion may be connected to shifter 94. Shifter 94 may thus be configured to selectively move first mechanical member 100 among the plurality of positions, such as between the first and second positions.

In some embodiments, mechanical assembly 72 may include a bias assembly 138, which may include any suitable structure configured to urge one or more of the mechanical members toward one or more positions. For example, bias assembly 138 may include supports 140 and springs 142. Supports 140 may be attached to one or more of the mechanical members and/or may be movably connected to the body. For example, supports 140 may include a first support 144 attached to second mechanical member 102 and pivotably connected to the body, and a second support 146 attached to third mechanical member 104 and pivotably connected to the body.

Springs 142 may be connected to end portions of the supports and may be configured to urge one or more of the mechanical members toward one or more positions. For examples, springs 142 may include a first spring 148 and a second spring 150. First spring 148 may include a first end portion 152 attached to first support 144, and a second end portion 154 attached to body 62. The first spring may be configured to urge the second mechanical member toward the third position.

Similarly, second spring 150 may include a first end portion 156 attached to second support 146, and a second end portion 158 attached to body 62. The second spring may be configured to urge the third mechanical member toward the fifth position. Although bias assembly 138 is shown to include coil springs, the bias assembly may alternatively, or additionally, include leaf spring(s), piano wire(s), and/or other elastic devices.

Figure 8:
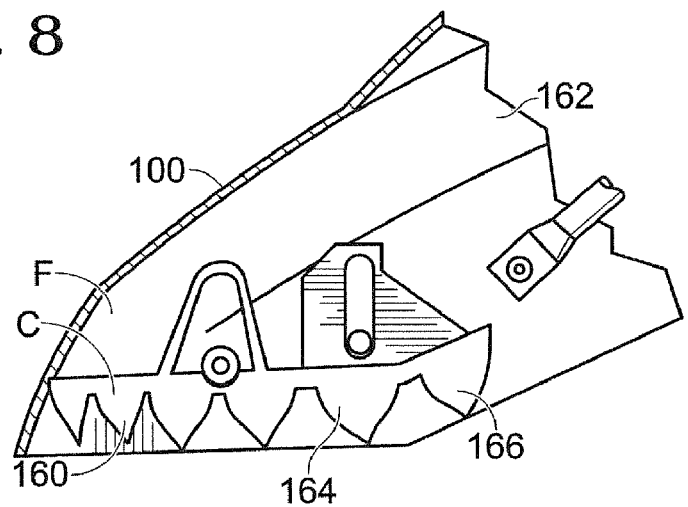
FIG. 8 is a partial view of the hood of FIG. 5 shown with another example of teeth in a retracted position.
Figure 9:
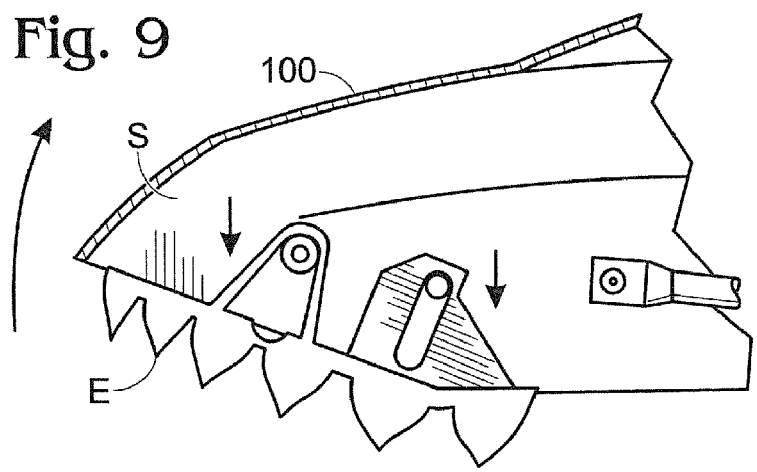
FIG. 9 is a partial view of the hood of FIG. 5 shown with the teeth of FIG. 8 in an extended position.

Additionally, although mechanical assembly 72 is shown to include three mechanical members 96, hood mechanical linkage 133, and bias assembly 138, the mechanical assembly may alternatively, or additionally, include any suitable structure adapted to move relative to the body among a plurality of configurations. For example, as shown in FIGS. 8-9, mechanical assembly 72 may include at least a fourth mechanical member 160. Fourth mechanical member may be movably connected to one or more other mechanical members and/or the body and configured to move among a plurality of positions. For example, fourth mechanical member 160 may be slidably connected to an interior 162 of first mechanical member 100.

Additionally, or alternatively, the fourth mechanical member may be configured to move between a retracted position C in which the fourth mechanical member is adjacent the first mechanical member, and an extended position E in which the fourth mechanical member is spaced from the first mechanical member relative to the retracted position. When the fourth mechanical member moves between the retracted and extended positions, that member may be referred to as a "retractable mechanical member."

In some embodiments, fourth mechanical member 160 may be configured to move between the retracted and extended positions when first mechanical member 100 is moved between the first and second positions. For example, movement of first mechanical member 100 from the first position toward the second position may move fourth mechanical member 160 from the retracted position toward the extended position, such as via gravitational forces. Additionally, or alternatively, movement of first mechanical member 100 from the second position toward the first position may move fourth mechanical member 160 from the extended position toward the retracted position, such as due to contact from bottom jaw 78 and/or other part(s) of body 62.

Additionally, the fourth mechanical member may include one or more animal-like features (or features of a toy animal) 164. For example, the fourth mechanical member may include teeth 166. Although fourth mechanical member 160 is shown to include specific animal-like features, the first mechanical member may additionally, or alternatively, include other animal-like features, such as the animal-like features discussed above and/or other type(s) of features.

Although children's ride-on vehicle 60 is shown to include body 62, wheel assembly 64, drive assembly 66, steering assembly 68, control assembly 70, and mechanical assembly 72, the vehicle may additionally, or alternatively, include any suitable structure configured to move a user across any suitable support surface and/or increase play value of the vehicle.

For example, vehicle 60 may include an audiovisual system (not shown) configured to provide audio and/or visual outputs responsive, at least in part, to movement of the shifter and/or one or more of the mechanical members. The audiovisual system may, for example, include lights behind the eyes of the hood and a sound generator that generates sounds associated with one or more animals, which may be activated when the mechanical assembly is moved from the untransformed configuration to the transformed configuration.

Figure 10:
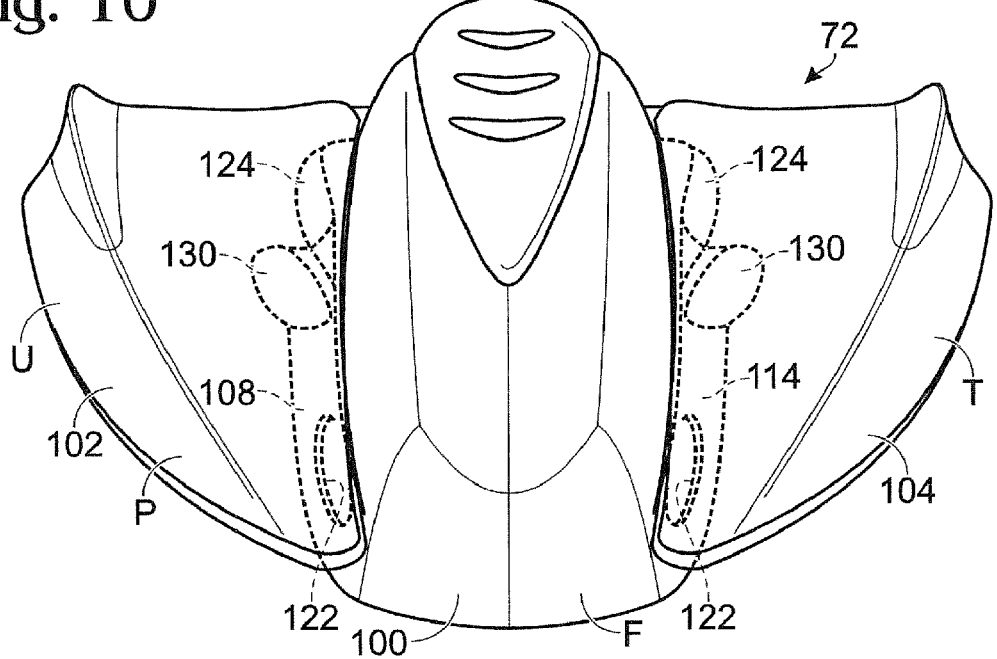
FIG. 10 is a partial front view of the children's ride-on vehicle of FIG. 2, showing a mechanical assembly in an untransformed configuration.

In operation, the first, second, and third mechanical members initially may be in the first, third, and fifth positions, respectively, as shown in FIG. 10. Second and third mechanical members may hide the first and fourth portions of the first mechanical member, which may include the eyes, nostrils, and ribs. The mechanical assembly may be referred to being in an untransformed configuration U in FIG. 10.

Figure 11:
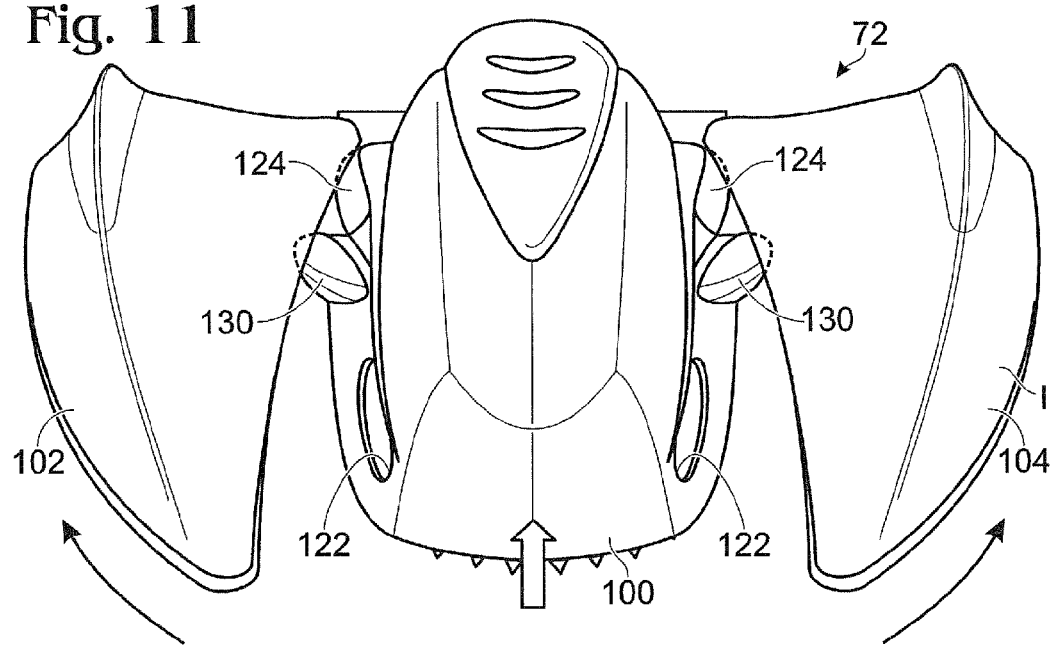
FIG. 11 is a partial front view of the children's ride-on vehicle of FIG. 2, showing the mechanical assembly of FIG. 10 in an intermediate configuration.

A user may move shifter 94 to pivot the first mechanical member toward the second position, as shown in FIG. 11. As the first mechanical member is pivoted, the ribs may contact the second and third mechanical members to move those members toward the fourth and sixth positions, respectively, which may be against urging of the bias assembly. The eyes, nostrils, and ribs may become more visible as the second and third mechanical members move apart. The mechanical assembly may be referred to being in an intermediate configuration I in FIG. 11.

Figure 12:
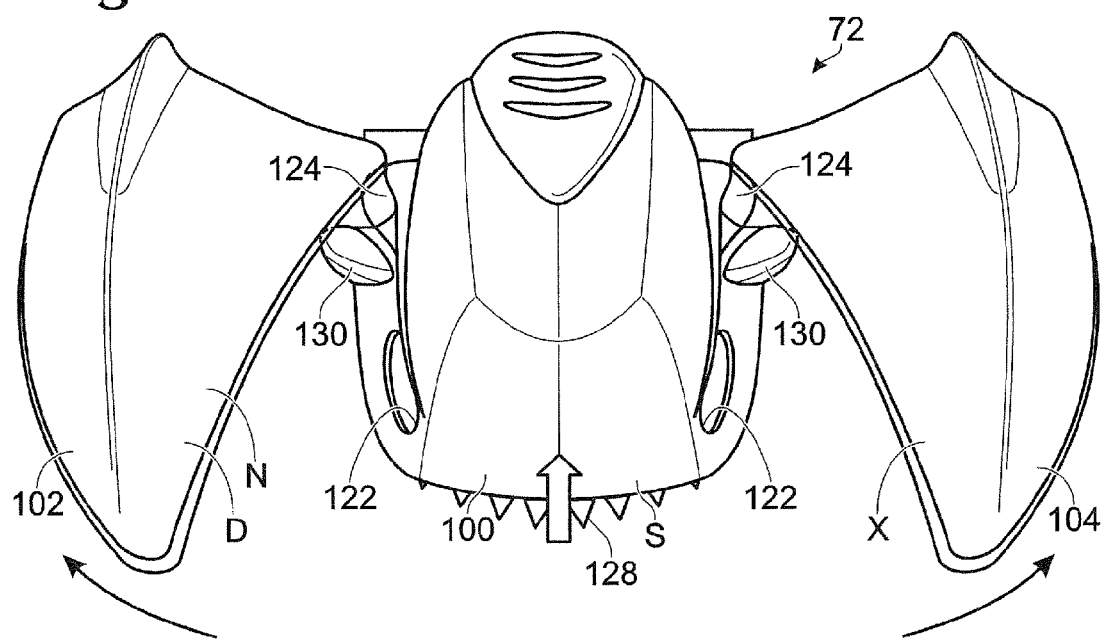
FIG. 12 is a partial front view of the children's ride-on vehicle of FIG. 2, showing the mechanical assembly of FIG. 10 in a transformed configuration.

The user may continue pivoting shifter 94 until the first mechanical member is in the second position, as shown in FIG. 12. As the first mechanical member is pivoted, the ribs may continue to contact the second and third mechanical members to move those members to the fourth and sixth positions, respectively. The eyes, nostrils, and ribs may become visible as the second and third mechanical members are moved apart.

The mechanical assembly may be referred to being in a transformed configuration N in FIG. 12. The different configurations of the mechanical assembly also are shown in FIGS. 13-15. However, the steps discussed above may be performed in different sequences and in different combinations, not all steps being required for all embodiments of the children's ride-on vehicle.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

The invention claimed is:

1. A children's ride-on vehicle, comprising:
   a body including at least one seat sized for a child;
   a plurality of wheels rotatably coupled to the body;
   a mechanical assembly including:
      a first mechanical member movably connected to the body and configured to move between a retracted extended position and an extended position;
      a second mechanical member visible from adjacent the front of the vehicle, at least partially engaged with the first mechanical member, movably connected to the body, and configured to move between a concealing position and a revealing position, wherein in the concealing position the second mechanical member conceals a portion of the first mechanical member so that the portion of the first mechanical member is not visible from adjacent the front of the vehicle, and wherein in the revealing position the second mechanical member does not conceal the portion of the first mechanical member so that the portion of the first mechanical member is visible from adjacent the front of the vehicle; and a biasing member configured to urge the second mechanical member toward the concealing position; and a user input device positioned to receive inputs from a child sitting on the at least one seat, and configured to selectively move the first mechanical member between the retracted position and the extended position;

wherein the first mechanical member is configured to move the second mechanical member from the concealing position to the revealing position when the first mechanical member is moved from the retracted position to the extended position in response to user manipulation of the user input device; and wherein the biasing member is configured to move the second mechanical member from the revealing position to the concealing position when the first mechanical member is moved from the extended position to the retracted position in response to user manipulation of the user input device.

2. The children's ride-on vehicle of claim 1, wherein the biasing member includes a spring.

3. The children's ride-on vehicle of claim 1, wherein the second mechanical member is configured to pivot laterally relative to the body between the concealing position and the revealing position.

4. The children's ride-on vehicle of claim 3, wherein the second mechanical member is configured to pivot substantially parallel to a ground surface on which the children's ride-on vehicle is positioned between the concealing position and the revealing position.

5. The children's ride-on vehicle of claim 3, wherein the first mechanical member is configured to pivot up and down relative to the body between the retracted position and the extended position.

6. The children's ride-on vehicle of claim 1, wherein the second mechanical member at least partially overlaps the first mechanical member when the second mechanical member is in the concealing position, and wherein the second mechanical member overlaps less of the first mechanical member when the second mechanical member is in the revealing position.

7. The children's ride-on vehicle of claim 1, wherein the user input device is configured to be selectively and at least temporarily locked by a child sitting on the at least one seat so that the first mechanical member is retained in one of the retracted position and the extended position.

8. The children's ride-on vehicle of claim 1,
wherein the first mechanical member includes a hood; and
wherein the second mechanical member includes a fender.

9. The children's ride-on vehicle of claim 8, wherein the second mechanical member includes two fenders.

10. The children's ride-on vehicle of claim 1, further comprising a battery-powered drive assembly configured to selectively drive rotation of at least one of the plurality of wheels.

11. A children's ride-on vehicle, comprising:
a body including at least one seat sized for a child;
a plurality of wheels rotatably coupled to the body;
a mechanical assembly including:

a first mechanical member movably connected to the body and configured to move between a retracted position and an extended position; and a second mechanical member visible from adjacent the front of the vehicle, movably connected to the body, and configured to move between a concealing position and a revealing position, wherein in the concealing position the second mechanical member conceals a portion of the first mechanical member so that the portion of the first mechanical member is not visible from adjacent the front of the vehicle, and wherein in the revealing position the second mechanical member does not conceal the portion of the first mechanical member so that the portion of the first mechanical member is visible from adjacent the front of the vehicle; and a user input device positioned to receive inputs from a child sitting on the at least one seat, wherein the user input device is configured to selectively move the first mechanical member between the retracted position and the extended position, and wherein the user input device is configured to be selectively and at least temporarily locked by a child sitting on the at least one seat so that the first mechanical member is retained in one of the retracted position and the extended position;

wherein the first mechanical member is configured to move the second mechanical member from the concealing position to the revealing position when the first mechanical member is moved from the retracted position to the extended position in response to user manipulation of the user input device; and wherein the second mechanical member is configured to move from the revealing position to the concealing position when the first mechanical member is moved from the extended position to the retracted position in response to user manipulation of the user input device.

12. The children's ride-on vehicle of claim 11, wherein the second mechanical member is configured to pivot laterally relative to the body between the concealing position and the revealing position.

13. The children's ride-on vehicle of claim 12, wherein the second mechanical member is configured to pivot substantially parallel to a ground surface on which the children's ride-on vehicle is positioned between the concealing position and the revealing position.

14. The children's ride-on vehicle of claim 12, wherein the first mechanical member is configured to pivot up and down relative to the body between the retracted position and the extended position.

15. The children's ride-on vehicle of claim 11, wherein the second mechanical member at least partially overlaps the first mechanical member when the second mechanical member is in the concealing position, and wherein the second mechanical member overlaps less of the first mechanical member when the second mechanical member is in the revealing position.

16. The children's ride-on vehicle of claim 11,
wherein the first mechanical member includes a hood; and
wherein the second mechanical member includes a fender.

17. The children's ride-on vehicle of claim 16, wherein the second mechanical member includes two fenders.

18. The children's ride-on vehicle of claim 11, further comprising a battery-powered drive assembly configured to selectively drive rotation of at least one of the plurality of wheels.

19. A children's ride-on vehicle, comprising:
a body including at least one seat sized for a child;

a plurality of wheels rotatably coupled to the body;

means for transforming the children's ride-on vehicle from an untransformed configuration to a transformed configuration, wherein in the transformed configuration, portions of the children's ride-on vehicle are visible from adjacent the front of the vehicle that are not visible when the vehicle is in the untransformed configuration, and wherein the vehicle is biased toward the untransformed configuration; and a user input device positioned to receive inputs from a child sitting on the at least one seat, and configured to selectively reconfigure the vehicle between the untransformed configuration and the transformed configuration.

20. The children's ride-on vehicle of claim 19, wherein the user input device is configured to be selectively and at least temporarily locked by a child sitting on the at least one seat so that the vehicle is retained in one of the transformed configuration and the untransformed configuration.

* * * * *

UNITED STATES PATENT AND TRADEMARK OFFICE
CERTIFICATE OF CORRECTION

PATENT NO. : 8,272,920 B2  
APPLICATION NO. : 13/192874  
DATED : September 25, 2012  
INVENTOR(S) : Gerald P. Sitarski, David Grober and Ronald M. Asbach Page 1 of 1

It is certified that error appears in the above-identified patent and that said Letters Patent is hereby corrected as shown below:

In the Claims:

In Column 14, lines 60-61, after "a retracted" delete "extended".

Signed and Sealed this
Tenth Day of June, 2014

Michelle K. Lee
*Deputy Director of the United States Patent and Trademark Office*